(12) United States Patent
Senn

(10) Patent No.: US 9,004,896 B2
(45) Date of Patent: Apr. 14, 2015

(54) OVEN FOR PLASTIC PREFORMS WITH PARTLY TRANSPARENT RADIATOR

(75) Inventor: Konrad Senn, Regensburg (DE)

(73) Assignee: Krones AG, Neutraubling (DE)

(*) Notice: Subject to any disclaimer, the term of this patent is extended or adjusted under 35 U.S.C. 154(b) by 0 days.

(21) Appl. No.: 12/716,677

(22) Filed: Mar. 3, 2010

(65) Prior Publication Data

US 2010/0225029 A1    Sep. 9, 2010

(30) Foreign Application Priority Data

Mar. 5, 2009 (DE) .................. 10 2009 011 361

(51) Int. Cl.
| | |
|---|---|
| B29C 49/64 | (2006.01) |
| B29C 49/68 | (2006.01) |
| B29C 35/08 | (2006.01) |
| B29K 67/00 | (2006.01) |

(52) U.S. Cl.
CPC .............. *B29C 49/6418* (2013.01); *B29C 49/68* (2013.01); *B29C 2035/0822* (2013.01); *B29K 2067/00* (2013.01)

(58) Field of Classification Search
CPC .... B29C 49/64; B29C 49/6418; B29C 49/68; B29C 2035/0822
USPC ........ 425/174.4, 174, 526; 264/458, 481, 492
See application file for complete search history.

(56) References Cited

U.S. PATENT DOCUMENTS

| | | | |
|---|---|---|---|
| 5,982,078 A  * | 11/1999 | Krisl et al. ..................... 313/112 |
| 6,361,301 B1 * | 3/2002 | Scaglotti et al. ........... 425/174.4 |
| 2006/0280825 A1* | 12/2006 | Cochran et al. ............ 425/174.4 |

FOREIGN PATENT DOCUMENTS

| | | |
|---|---|---|
| DE | 3823670 A1 | 10/1990 |
| DE | 102006015853 A1 | 10/2007 |
| DE | 202008005252 U1 | 8/2008 |
| DE | 10 2007 031 771 A1 | 1/2009 |
| EP | 1 108 513 A2 | 6/2001 |
| WO | 01/62463 A1 | 8/2001 |
| WO | 2009/006885 A2 | 1/2009 |

OTHER PUBLICATIONS http://www.almazoptics.com/Quartz.htm (retrieved May 11, 2011).*
http://www.quartz.com/gedata.html (retrieved May 11, 2011).*
http://www.u-oplaz.com/optics/optics03-cur.htm (retrieved May 11, 2011).*

(Continued)

*Primary Examiner* — Timothy Kennedy
(74) *Attorney, Agent, or Firm* — Novak Druce Connolly Bove + Quigg LLP

(57) ABSTRACT

An apparatus for heating plastic receptacles includes a transport device which transports the receptacles along a predetermined transport path and at least one heating device for heating the plastic receptacles. The heating device includes at least one radiation source which directs radiation at the plastic receptacles and at least one first reflector element which reflects radiation emitted from the radiation source. The apparatus includes a proportional reflection device which transmits radiation emitted by the radiation source with wavelengths in a first predetermined wavelength range onto the receptacle and reflects radiation with wavelengths in a second predetermined wavelength range onto the radiation source.

18 Claims, 2 Drawing Sheets

(56) References Cited

OTHER PUBLICATIONS http://en.wikipedia.org/wiki/Polyethylene_terephthalate (Retrieved Jan. 26, 2012).*

Spitzer et al, Infrared Lattice Bands of Quartz, 1961, Physical Review, vol. 121, No. 5, pp. 1324-1355.*
English machine translation of DE 3823670, retrieved from EPO database Dec. 15, 2014.*
German Search Report for EP 10 15 4604, mailed Jun. 18, 2010.

* cited by examiner

OVEN FOR PLASTIC PREFORMS WITH PARTLY TRANSPARENT RADIATOR

CROSS-REFERENCE TO RELATED APPLICATION

This application claims the benefit of priority of German Patent Application No. 10 2009 011 361.4, filed Mar. 5, 2009, pursuant to 35 U.S.C. 119(a)-(d), the disclosure of which is incorporated herein by reference in its entirety as if fully set forth herein.

TECHNICAL FIELD

The present disclosure relates to ovens for heating plastic receptacles and, in particular, ovens for heating plastic preforms.

BACKGROUND

It is known from the prior art to reshape plastic preforms into plastic receptacles in blowing stations. For that purpose the plastic receptacles are heated before the actual blowing process in order to be expanded in this way.

Various heating devices and ovens, respectively, are known from the prior art which heat such plastic preforms. Different procedures are known from the prior art for heating the preforms. Firstly microwave ovens are known which use microwaves to heat the plastic preforms. Also however infrared ovens are known which heat the receptacles using thermal radiation.

In previously conventional processes, the plastic preform is irradiated with IR radiators (infrared) with a continuous Planckian radiation spectrum. The advantage here is the high efficiency of the radiation source which is almost 100%. One disadvantage of this procedure is that the preform does not absorb all wavelengths evenly. For example, there are wavelengths in which untreated polyethylene terephthalate (PET) is virtually transparent, such as for example at a wavelength of approximately 1000 nm. At other wavelengths, the plastic preform, where made from PET, is substantially totally impermeable such as for example at 2300 nm, and in further other ranges it is partly transparent.

One disadvantage of the said IR radiators is that they have a very high energy requirement. Secondly however not all wavelengths of the radiator can be used in the same way.

DE 10 2006 015853 A1 discloses a heating method for plastics and other materials with an infrared device. At least two radiators are provided which are used on the basis of one and the same functional ceramic with a selective infrared, wherein their emission spectrums largely correspond with the absorption spectrums of the materials to be heated. In this case therefore the aim is for as much radiation as possible to be absorbed by the plastic preforms. This however leads in some cases to heating occurring only on the surface of the plastic preforms and not in the inner zones of the material.

DE 20 2008 005252 U1 discloses only a lamp device for a radiant heating of preforms. A reflector is provided which, in relation to a peripheral direction of an axis running through the radiation source, extends peripherally over an angle which is greater than 200°.

DE 38 23 670 A1 describes a method for heating preforms with at least one heater emitting radiation, the radiation of which is aligned at least also in the direction towards the preform to be heated. The preform is irradiated with a radiation which heats its wall in the inner zone as strongly as in the outer zone.

The present invention is based on the object of making the ovens known from the prior art more energy-efficient. Furthermore, an innovative energy-saving method is provided for preform heating, in particular for the stretch-blow moulding process in drinks bottles.

SUMMARY OF INVENTION

In accordance with various aspects of the disclosure, an apparatus for heating plastic receptacles has a transport device which transports the receptacles along a preset transport path. Furthermore, at least one heating device is provided to heat these plastic receptacles, wherein the heating device has at least one radiation source which directs radiation onto the plastic receptacles. Furthermore, at least one first reflector element is provided which reflects radiation emitted by the radiation source.

According to the disclosure, the apparatus has a proportional reflection device which transmits radiation emitted by the radiation source with wavelengths in a first predetermined wavelength range onto the receptacle and reflects radiation with wavelengths in a second predetermined wavelength range. The term radiation source means in particular a light source which emits infrared light. This radiation is directed at the plastic receptacles, wherein it is possible that the radiation from the radiation source reaches the plastic receptacle directly or the radiation first reaches the reflector element and then reaches the plastic receptacle from this.

The first reflector element may comprise a reflector element which completely reflects the radiation emitted by the radiation source onto the radiation source or the receptacle itself in order in this way to increase the emission of radiation as a whole. Such reflector elements are known from the prior art. The proportional reflection device according to the disclosure achieves that part of the radiation emitted, in particular the radiation which cannot be used to heat the plastic receptacle, is returned back to the radiation source and thus heats it additionally.

In this way the entire apparatus can be used with greater energy efficiency. For example in the wavelength range in which plastic, for example PET, is transparent, only very little radiation energy is absorbed by the plastic preform, i.e., the radiation simply passes through the plastic preform and thus does not heat the plastic preform. Also in the totally impermeable range, part of the radiation is reflected and part absorbed in the surface of the plastic preform, which in turn leads to a strong heating of the surface and hence to uneven heating of the plastic preform. In particular, in a partly transparent range, the heating of the plastic preform is approximately even and at the same time sufficient energy is emitted to the plastic preform.

In some aspects, the first reflector element at least partly surrounds the radiation source as is known from the prior art.

According to various aspects, the proportional reflection device reflects the radiation in a second predetermined wavelength range back onto the radiation source. Thus it is possible for the radiation to be reflected directly onto the radiation source, but it would however also be possible for the radiation to be reflected indirectly onto the radiation source, for example, via the first reflection element.

In some exemplary embodiments, the proportional reflection device may be produced as one piece. It would however also be possible for this proportional reflection device to comprise two components, namely firstly a transmissive glass for example and secondly a reflector element, wherein the receptacles are arranged between this transmissive glass and the reflector element. Thus for example it would be possible for this proportional reflection device to have a so-called IRC coating (infrared coating). Such a layer can for example reflect the heat emitted by a spiral-wound filament as an infrared beam and in this way contribute further to heating the radiation source. At the same time however visible light is transmitted. In this way less energy is required to maintain the temperature of the filament of the radiation source and at the same time the light yield remains constant, which in total leads to an increase in efficiency.

The present disclosure uses similar technology, wherein here however it is not primary light in the visible range which is transmitted but light in the ranges in which the plastic receptacles have a certain absorption. More precisely the wavelengths which are poorly used by the plastic preforms are thrown back onto the radiation source and ideally only those wavelengths in the partly transparent range act on the plastic preform. This leads as stated above to the radiation source requiring less energy to be brought to temperature and secondly the plastic preforms need not be cooled so much at the surface.

In some exemplary embodiments therefore the proportional reflection device reflects the radiation in a second predetermined wavelength range back onto the radiation source in order to heat this additionally.

In some exemplary embodiments this proportional reflection device is arranged in a direct beam path between the radiation source and the receptacle. As stated above however the proportional reflection device can also comprise several components, wherein one of these components is arranged for example in said direct beam path and the other component is behind the receptacle.

Thus, in some embodiments, the proportional reflection device may be provided between the radiation source and the receptacle.

In some exemplary embodiments, the first wavelength range contains wavelengths for which the transmission of the receptacle material may be between about 10% and about 90%, or between about 20% and about 80%, or between about 30% and about 70%. This is initially surprising as it would have been assumed that the wavelengths would be selected in which the plastic material of the receptacle would have strong absorption. This strong absorption as stated above means that only the surfaces of the receptacle are strongly heated or even overheated. Therefore in this embodiment wavelengths have been deliberately selected which are partly transmitted by said plastic.

According to various aspects, the first wavelength range is between 1700 nm and 2100 nm. This wavelength range has proved desirable in the context of a number of experiments, in particular if the plastic receptacles are made from PET.

In some exemplary embodiments, the radiation source itself has a partly transparent coating, where in particular only a part of the said radiation source is partly transparent and the other reflects the entire spectrum, as the plastic receptacles are only moved past on one side of the radiator. It would however also be possible for the plastic receptacles to be moved past on two sides of the radiation source.

In some embodiments, as stated above, the proportional reflection device is formed of two pieces. Firstly between the receptacle and the radiation source is provided a partly transparent plate which allows transmission of the wavelengths that are used to heat the plastic preform. The other wavelengths are absorbed by this partly transparent plate or reflected in arbitrary spatial directions and in this way contribute, albeit only slightly, to the heating of the radiation source. The radiation reflected by the reflector is itself at least partly returned to the radiation source and contributes to its heating. It is however pointed out that in this embodiment, the main effect is that the receptacle is heated with the precisely adapted wavelengths and in this way in particular overheating of the surface is prevented. The heating of the radiation source which may also be desirable is here achieved only partially.

According to various aspects, the second wavelength range has wavelengths which are shorter than the wavelengths of the first wavelength range. In some embodiments, the second wavelength range has wavelengths which are longer than the wavelengths of the first wavelength range. Ideally only those wavelengths are transmitted which are used for heating the preform and wavelengths outside this range are reflected again. Thus the described partial transparency may be designed such that the majority of the radiation not transmitted is reflected and as little as possible absorbed in the proportional reflection device or its coating.

As the manufacturing of a layer which reflects both long and short wave light and transmits only a mid-range part is partially technically complex, it would also be conceivable for this proportional reflection device to have two filter elements, namely a long-wave pass filter and a short-wave pass filter. These layers could for example be arranged above each other. Furthermore it would also be possible for only a long-wave pass filter to be used and the short-wave pass filter radiation, at which PET usually has high transmission, is reflected via reflectors behind the receptacles back onto the receptacles and only then reaches the radiation source again.

In some exemplary embodiments the radiation source is arranged stationary. Here it is possible that the apparatus has a multiplicity of radiation sources which are arranged one after the other along the transport path and in this way the receptacles are heated along their movement on the path.

In some embodiments the apparatus has a reflector device wherein the receptacle is transported between the further reflector device and the radiation source. This means that this further reflector device is arranged behind the receptacle viewed from the radiation source. This further reflector device can also have a parabolic or curved profile so that the radiation reflected by the reflector device is focussed on the radiation source.

In some exemplary embodiments a multiplicity of radiation sources is arranged in a longitudinal direction of the receptacle so that the receptacle and in particular the plastic preform is substantially completely heated from top to bottom. In some aspects these radiation sources are however arranged such that the openings of the receptacles are not heated or only slightly heated.

The present disclosure is furthermore directed at a plant for manufacturing of plastic receptacles, where this plant has an apparatus of the type described above and a device arranged downstream of this apparatus in the transport direction of the receptacles for blow-forming of the plastic preforms into receptacles.

The present disclosure is furthermore directed to methods of heating plastic receptacles, and in particular plastic preforms, wherein the plastic receptacles are transported along a predetermined transport path and here the plastic receptacles are heated by means of a first radiation source which directs radiation onto the plastic receptacles. According to the disclosure the radiation emitted from the radiation source with wavelengths in a first predetermined wavelength range is directed at the receptacle and radiation emitted by the radiation source with wavelengths in a second predetermined wavelength range is reflected or not transmitted by a proportional reflection device and in particular reflected onto the radiation source.

According to various aspects, the first wavelength range contains wavelengths for which the transmission of the material of the plastic receptacle may be between about 10% and about 90%, or between about 20% and about 80%, or between about 30% and about 70%. This area of mid-range transmission is particularly suitable for heating the plastic receptacles.

Some further advantages and embodiments may become evident from the attached drawings.

DETAILED DESCRIPTION

Figure 1:
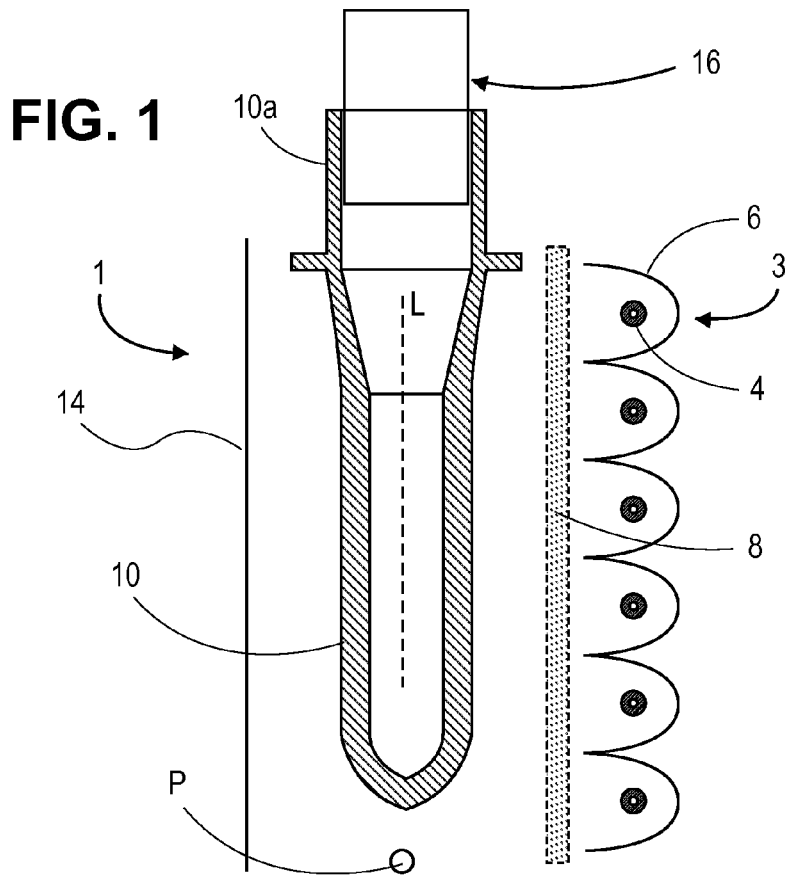
FIG. 1 is a section view of an exemplary apparatus for heating plastic receptacles according to the disclosure.

FIG. 1 shows a section view of an apparatus 1 for heating receptacles according to the disclosure. A receptacle 10 is shown which is transported by a transport device 16 reaching into an opening 10a of the receptacle and is thus here transported along transport path P that extends perpendicular to the figure plane. This apparatus 1 may comprise a multiplicity of radiation sources 4 which in turn are part of radiation devices designated as a whole as 3. These radiation sources are provided here along a longitudinal direction L of the receptacle 10. Reference numeral 6 refers to a reflector device which reflects the radiation emitted by the radiation source 4 and in particular reflects this back to the radiation source 4 itself. Furthermore however this radiation is also reflected in the direction of the receptacle 10.

The reference numeral 8 designates a proportional reflection device which extends along the entire length L of the receptacle 10 and also along all radiation sources 4. This proportional reflection device transmits radiation in a wavelength range which is suitable for heating the receptacle 10 and reflects radiation which lies outside said wavelength range back to the radiation source 4.

Figure 2:
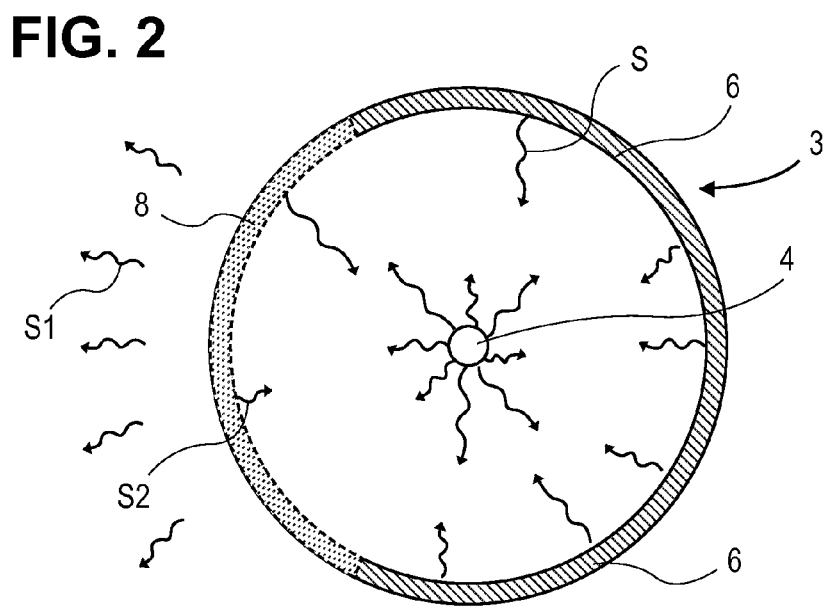
FIG. 2 is a view of a radiation device for an exemplary apparatus according to the disclosure.

FIG. 2 shows a view depiction of a radiation device 3 according to the invention. Here too again a first reflector element 6 is provided which partially surrounds the radiation source 4 in the peripheral direction, like the proportional reflection device 8 which is arranged in the area in which radiation S should emerge from the radiation device 3. In the embodiment shown in FIG. 2, the reflector element 6 extends through an angle of around 240° about the radiation source 4 and the proportional reflection device extends through an angle of around 120°. Radiation with the radiation component S2 is reflected by this proportional reflection device as shown in FIG. 2 back to the radiation source 4, where in contrast the proportion S1 of radiation S reaches the outside and hence the receptacle shown in FIG. 1.

Figure 3:
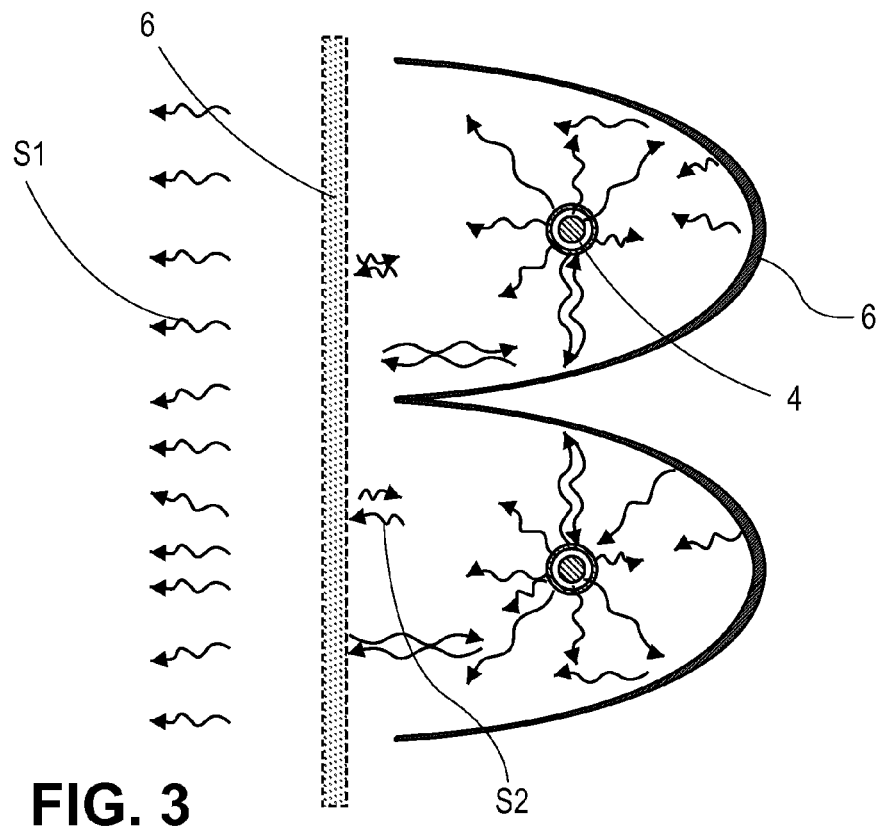
FIG. 3 is an exemplary embodiment of a radiation device according to the disclosure.

FIG. 3 shows an enlarged view of the apparatus shown in FIG. 1. Here again it is seen that certain radiation components S2 are reflected back to the radiation device 4 and other radiation components S1 reach the receptacle (not shown).

Figure 4:
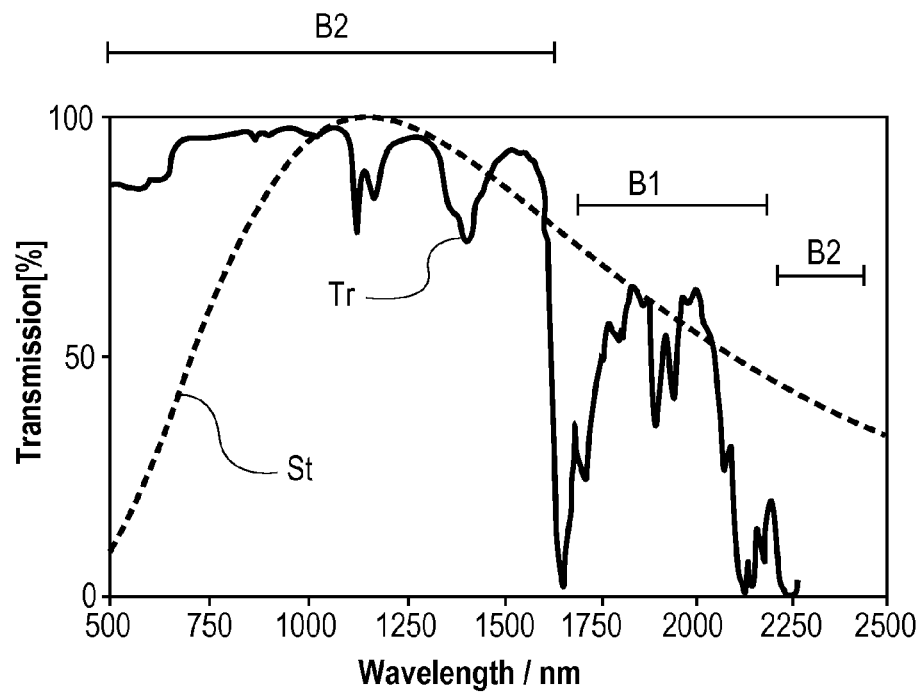
FIG. 4 is a diagram to illustrate transmissions using the example of PET plastic.

FIG. 4 shows a diagrammatic transmission curve Tr for PET. It is evident that the transmission of PET is very high in a wavelength range of around 1600 nanometers, the transmission then falls greatly and in a range between 1600 nanometers and 2100 nanometers is between around 30% and around 70%. This range B1 is particularly suitable for heating the PET receptacles. The reference St identifies a curve at a radiation temperature of 2500 K.

Range B2 is therefore desirably reflected back onto the radiation source 4 and in this way contributes to heating the radiation source and hence to saving energy. Secondly this left-hand range B2 between 500 and 1600 nm is not directed at the receptacles as it would be transmitted by these without great effect, i.e. in particular without a great heating effect. The second range B2 with wavelengths over 2100 nanometers also does not reach the receptacles as it would heat their walls very greatly and in this case the plastic preforms could be damaged.

It will be apparent to those skilled in the art that various modifications and variations can be made to the apparatuses for producing plastic containers of the present disclosure without departing from the scope of the invention. Other embodiments of the invention will be apparent to those skilled in the art from consideration of the specification and practice of the invention disclosed herein. It is intended that the specification and examples be considered as exemplary only.

What is claimed is:

1. Apparatus for heating plastic receptacles comprising:
a transport device which transports the plastic receptacles along a predetermined transport path;
at least one heating device for heating the plastic receptacles, the heating device including
a radiation source which directs radiation at the plastic receptacles, wherein the radiation source emits infrared radiation in a first wavelength range and in a second wavelength range, and
at least one first reflector element which reflects radiation emitted by the radiation source; and
a proportional reflection device configured to transmit infrared radiation emitted by the radiation source with wavelengths only in the first wavelength range onto the receptacle and configured to reflect infrared radiation with wavelengths in the second wavelength range back onto the radiation source, the proportional reflection device being configured to reflect a majority of the infrared radiation not being transmitted,
wherein the first wavelength range is between 1700 nm and 2100 nm, and
wherein the first wavelength range and the second wavelength range are different from each other.

2. Apparatus according to claim 1, wherein the proportional reflection device is arranged in a direct beam path between the radiation source and the plastic receptacles.

3. Apparatus according to claim 1, wherein the proportional reflection device is arranged between the radiation source and one of the plastic receptacles.

4. Apparatus according to claim 1, wherein the first wavelength range contains wavelengths for which the transmission of the receptacle material is between about 10% and about 90%.

5. Apparatus according to claim 4, wherein the first wavelength range contains wavelengths for which the transmission of the receptacle material is between about 20% and about 80%.

6. Apparatus according to claim 5, wherein the first wavelength range contains wavelengths for which the transmission of the receptacle material is between about 30% and about 70%.

7. Apparatus according to claim 1, wherein the second wavelength range contains wavelengths which are shorter than the wavelengths of the first wavelength range.

8. Apparatus according to claim 1, wherein the second wavelength range contains wavelengths which are longer than the wavelengths of the first wavelength range.

9. Apparatus according to claim 1, wherein the radiation source is stationary.

10. Apparatus according to claim 1, wherein the apparatus has an additional reflector device, where the plastic receptacles are transported between the additional reflector device and the radiation source.

11. Apparatus according to claim 1, wherein a plurality of radiation sources is arranged in a longitudinal direction of the plastic receptacles.

12. Apparatus for heating plastic receptacles comprising:
   at least one heating device configured to heat plastic receptacles, the heating device including
      a radiation source configured to direct radiation at one of the plastic receptacles, wherein the radiation source emits infrared radiation in a first wavelength range and in a second wavelength range, and
      at least one first reflector element configured to reflect radiation emitted by the radiation source toward the one of the plastic receptacles; and
   a proportional reflection device configured to transmit infrared radiation emitted by the radiation source with wavelengths only in the first wavelength range onto the one of the plastic receptacles and configured to reflect infrared radiation with wavelengths in the second wavelength range back onto the radiation source, the proportional reflection device being configured to reflect a majority of the infrared radiation not being transmitted,
   wherein the first wavelength range is between 1700 nm and 2100 nm, and
   wherein the first wavelength range and the second wavelength range are different from each other.

13. Apparatus according to claim 12, wherein the proportional reflection device is configured to minimize absorption of the infrared radiation not being transmitted.

14. Apparatus according to claim 12, wherein the second wavelength range includes wavelengths below and above the first wavelength range.

15. Apparatus according to claim 1, wherein the proportional reflection device is configured to minimize absorption of the infrared radiation not being transmitted.

16. Apparatus according to claim 1, wherein the second wavelength range includes wavelengths below and above the first wavelength range.

17. Apparatus for heating plastic receptacles comprising:
   a transport device configured to transport the plastic receptacles along a predetermined transport path;
   at least one heating device for heating the plastic receptacles, the heating device including
      a radiation source configured to direct radiation at the plastic receptacles, wherein the radiation source emits infrared radiation in a first wavelength range and in a second wavelength range, and
      at least one first reflector element configured to reflect radiation emitted by the radiation source; and
   a proportional reflection device configured to transmit infrared radiation emitted by the radiation source with wavelengths only in the first wavelength range and configured to reflect infrared radiation with wavelengths in the second wavelength range back onto the radiation source, the first predetermined range being selected so as to include wavelengths that are only partly transmitted by the plastic receptacles, and the second predetermined wavelength range being selected so as to include at least one of wavelengths to which the plastic receptacles are substantially impermeable and wavelengths to which the plastic receptacles are virtually transparent,
   wherein the first predetermined wavelength range is between 1700 nm and 2100 nm, and
   wherein the first wavelength range and the second wavelength range are different from each other.

18. Apparatus according to claim 17, wherein the proportional reflection device is configured to minimize absorption of the infrared radiation not being transmitted.

* * * * *